US012792967B2

(12) United States Patent
Yun et al.

(10) Patent No.: US 12,792,967 B2
(45) Date of Patent: Nov. 10, 2026

(54) METHOD AND SYSTEM FOR LIGHTENING MODEL FOR OPTIMIZING TO EQUIPMENT-FRIENDLY MODEL

(71) Applicant: NOTA, INC., Daejeon (KR)

(72) Inventors: Jaewoong Yun, Daejeon (KR); Kyunghwan Shim, Daejeon (KR)

(73) Assignee: NOTA, INC, Daejeon (KR)

( * ) Notice: Subject to any disclaimer, the term of this patent is extended or adjusted under 35 U.S.C. 154(b) by 537 days.

(21) Appl. No.: 18/466,629

(22) Filed: Sep. 13, 2023

(65) Prior Publication Data

US 2025/0029002 A1 Jan. 23, 2025

(30) Foreign Application Priority Data

Jul. 21, 2023 (KR) ........................ 10-2023-0095333

(51) Int. Cl.
*G06N 20/00* (2019.01)

(52) U.S. Cl.
CPC .................................... *G06N 20/00* (2019.01)

(58) Field of Classification Search
CPC ....... G06N 20/00; G06N 3/082; G06N 3/0495
See application file for complete search history.

(56) References Cited

U.S. PATENT DOCUMENTS

2019/0251442 A1* 8/2019 Koivisto .................. G06N 3/09
2021/0073643 A1* 3/2021 Partovi Nia ......... G06N 3/0495
2022/0114455 A1* 4/2022 Samek ................... G06N 3/096
2022/0253708 A1* 8/2022 Tamada ................... G06N 5/04
2024/0028950 A1* 1/2024 Saha .................... G06N 3/0464

FOREIGN PATENT DOCUMENTS

CN 111461322 A 7/2020

OTHER PUBLICATIONS

CN 117197524 A, Wang, Jian Image Classifying Method Based on Lightweight Network Structure of Pruning, English translation, Filed Jul. 6, 2023 (Year: 2023).*
Woo, Y., et al., "Zero-Keep Filter Pruning for Energy/Power Efficient Deep Neural Networks," MDPI Electronics 2021, 10, 1238. https://doi.org/10.3390/electronics10111238.
Office Action issued Jan. 30, 2026, in corresponding Korean Application No. 10-2023-0095333; filed Jul. 21, 2023; 5 pages.

* cited by examiner

*Primary Examiner* — Barbara M Level
(74) *Attorney, Agent, or Firm* — Christensen O'Connor Johnson Kindness PLLC

(57) ABSTRACT

Disclosed is a model compression method and system for compressing a model for optimizing to an equipment-friendly model. A model compression method may include acquiring criteria and sparsity for each filter of a model to which unstructured pruning is already applied, determining a filter for applying structured pruning among filters of the model based on the criteria and the sparsity, and applying the structured pruning to the model based on the determined filter.

16 Claims, 8 Drawing Sheets

METHOD AND SYSTEM FOR LIGHTENING MODEL FOR OPTIMIZING TO EQUIPMENT-FRIENDLY MODEL

CROSS-REFERENCE TO RELATED APPLICATION

This application claims the priority benefit of Korean Patent Application No. 10-2023-0095333, filed on Jul. 21, 2023, in the Korean Intellectual Property Office, the disclosure of which is incorporated herein by reference.

BACKGROUND

1. Field of the Invention

Example embodiments relate to a model compression method and system for compressing a model for optimizing to an equipment-friendly model.

2. Description of the Related Art

Unstructured pruning methodology for an artificial intelligence (AI) model masks values that constitute each filter with zeroes to not affect a result value of the AI model. However, since an actual operation amount for matrix multiplication is not reduced, a specific acceleration library and dedicated hardware supporting the same are required to acquire a speed advantage.

Also, the existing studies on structured pruning have focused on pruning by determining criteria of each of filters within a single layer and research on global pruning is relatively lacking. Representative examples of global pruning in structured pruning include EagleEye and Artificial Intelligence Model Efficiency Toolkit (AIMET). However, EagleEye performs random pruning for each layer and AIMET performs pruning by subdividing a degree of compression to verify a degree of impact on a model performance.

However, in a current research flow in which a size of a model is gradually increasing, the corresponding methodologies are very inefficient in terms of time and resources.

A reference material includes Korean Patent Laid-Open Publication No. 10-2022-0157324.

SUMMARY

Example embodiments may provide a model compression method and system for compressing a model for optimizing to an equipment-friendly model.

Example embodiments may provide a compressed artificial intelligence (AI) model through the above model compression method and system.

Example embodiments may provide an inference method and system using the above compressed AI model.

According to an example embodiment, there is provided a model compression method of a computer device including at least one processor, the model compression method including acquiring, by the at least one processor, criteria and sparsity for each filter of a model to which unstructured pruning is already applied; determining, by the at least one processor, a filter for applying structured pruning among filters of the model based on the criteria and the sparsity; and generating, by the at least one processor, a compressed model by applying structured pruning to the model based on the determined filter.

According to an aspect, the determining may include generating a first list of filters for each layer by ordering filters included in a corresponding layer based on the criteria for each of layers included in the model; and generating a second list of filters for each layer by ordering filters included in the corresponding layer based on the sparsity for each of the layers.

According to another aspect, the determining may include excluding, from a final pruning target, a filter that is excluded from a pruning target based on both the criteria and the sparsity among the filters of the first list and the second list for the same layer of the model; and determining, as the final pruning target, a filter that is set as the pruning target based on both the criteria and the sparsity among the filters of the first list and the second list for the same layer of the model.

According to still another aspect, the determining may further include determining, as filters for value transfer, a first filter that is excluded from the pruning target based on the criteria and determined as the pruning target based on the sparsity and a second filter that is excluded from the pruning target based on the sparsity and determined as the pruning target based on the criteria, among the filters of the first list and the second list for the same layer of the model, and an order of the first filter in the first list and an order of the second filter in the second list may be the same.

According to still another aspect, the generating of the compressed model may include overwriting a non-zero value constituting the first filter at the same location in the second filter.

According to still another aspect, the first filter may be set as the final pruning target, and the second filter overwritten with the non-zero value may be excluded from the final pruning target.

According to still another aspect, the generating of the compressed model may include overwriting at least one value of a first filter that is determined based on the criteria on a second filter that is determined based on the sparsity and corresponds to the first filter, for the same layer of the model.

According to still another aspect, the generating of the compressed model may include removing the determined filter from the model.

According to still another aspect, an order of the first filter when filters of the same layer are ordered based on the criteria and an order of the second filter when the filters of the same layer are ordered on the sparsity may be the same.

According to still another aspect, the determining may include determining a filter included in a pruning target based on the sparsity among filters included in a layer of the model; and determining a filter for value transfer based on the criteria among filters included in the pruning target, for the layer.

According to still another aspect, the generating of the compressed model may include overwriting a non-zero value included in the determined filter for value transfer on a filter excluded from the pruning target, for the layer; and removing the filter included in the pruning target from the model, including the filter for value transfer.

A compressed model is provided according to the method.

According to an example embodiment, there is provided an inference method of a computer device including at least one processor, the inference method including processing inference for input data using a first model compressed by determining a filter for applying structured pruning among filters of a second model based on criteria and sparsity for each filter of the second model to which unstructured pruning is already applied and by removing the determined filter from the second model.

According to an example embodiment, there is provided a non-transitory computer-readable recording medium storing instructions that when executed by a processor, cause the processor to perform the second method.

According to an example embodiment, there is provided a computer device including at least one processor configured to execute computer-readable instructions. The at least one processor is configured to acquire criteria and sparsity for each filter of a model to which unstructured pruning is already applied, to determine a filter for applying structured pruning among filters of the model based on the criteria and the sparsity, and to generate a compressed model by applying the structured pruning to the model based on the determined filter.

According to an example embodiment, there is provided a computer device including at least one processor configured to execute computer-readable instructions. The at least one processor is configured to process inference for input data using a first model compressed by determining a filter for applying structured pruning among filters of a second model based on criteria and sparsity for each filter of the second model to which unstructured pruning is already applied and by removing the determined filter from the second model.

According to some example embodiments, there may be provided a model compression method and system for compressing a model for optimizing to an equipment-friendly model.

Also, according to some example embodiments, there may be provided a compressed AI model through the above compression method and system.

Also, according to some example embodiments, there may be provided an inference method and system using the above compressed AI model.

Also, according to some example embodiments, by blending two aspects, criteria and sparsity, using the result of unstructured pruning and by actually pruning filters, it is possible to achieve a real speed-up on any hardware that does not support an acceleration library while naturally achieving global pruning.

Also, according to some example embodiments, since it is possible to directly apply to pretrained models to which unstructured pruning provided from PyTorch or Tensorflow-keras is applied, quick convergence of a model may be expected in a finetuning process.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, example embodiments will be described with reference to the accompanying drawings.

A model compression system according to example embodiments may be implemented by at least one computer device and a model compression method according to example embodiments may be performed through at least one computer device included in the model compression system. A computer program according to an example embodiment may be installed and executed on the computer device, and the computer device may perform the model compression method according to example embodiments under control of the executed computer program. The computer program may be stored in computer-readable recording media to execute the model compression method on the computer device in conjunction with the computer device.

Figure 1:
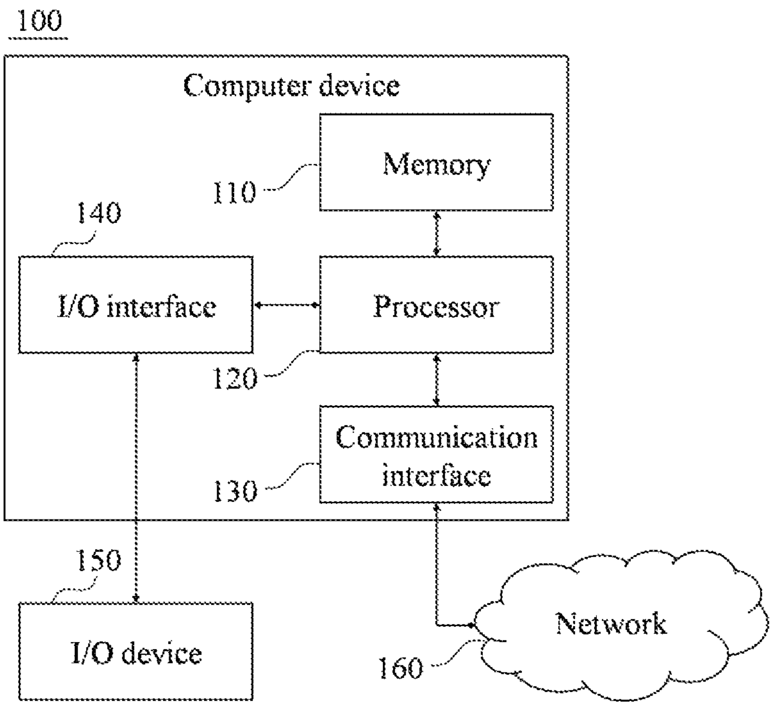
FIG. 1 is a diagram illustrating an example of a computer device according to an example embodiment.

FIG. 1 is a diagram illustrating an example of a computer device according to an example embodiment. Referring to FIG. 1, a computer device 100 may include a memory 110, a processor 120, a communication interface 130, and an input/output (I/O) interface 140. The memory 110 may include a permanent mass storage device, such as a random access memory (RAM), a read only memory (ROM), and a disk drive, as a non-transitory computer-readable recording medium. Here, the permanent mass storage device, such as a ROM and a disk drive, may be included in the computer device 100 as a permanent storage device separate from the memory 110. Also, an OS and at least one program code may be stored in the memory 110. Such software components may be loaded to the memory 110 from another non-transitory computer-readable recording medium separate from the memory 110. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 110 through the communication interface 130, instead of the non-transitory computer-readable recording medium. For example, the software components may be loaded to the memory 110 of the computer device 100 based on a computer program installed by files received over a network 160.

The processor 120 may be configured to process instructions of a computer program by performing basic arithmetic operations, logic operations, and I/O operations. The computer-readable instructions may be provided by the memory 110 or the communication interface 130 to the processor 120. For example, the processor 120 may be configured to execute received instructions in response to a program code stored in a storage device, such as the memory 110.

The communication interface 130 may provide a function for communication between the communication device 100 and another apparatus. For example, the processor 120 of the computer device 100 may forward a request or an instruction created based on a program code stored in the storage device such as the memory 110, data, and a file, to other apparatuses over the network 160 under control of the communication interface 130. Inversely, a signal, an instruction, data, a file, etc., from another apparatus may be received at the computer device 100 through the communication interface 130 of the computer device 100. For example, a signal, an instruction, data, etc., received through the communication interface 130 may be forwarded to the processor 120 or the memory 110, and a file, etc., may be stored in a storage medium, for example, the permanent storage device, further includable in the computer device 100.

The I/O interface 140 may be a device used for interfacing with an I/O device 150. For example, an input device may include a device, such as a microphone, a keyboard, a mouse, etc., and an output device may include a device, such as a display, a speaker, etc. As another example, the I/O interface 140 may be a device for interfacing with an apparatus in which an input function and an output function are integrated into a single function, such as a touchscreen. The I/O device 150 may be configured as a single apparatus with the computer device 100.

Also, according to other example embodiments, the computer device 100 may include a greater or smaller number of components than the number of components of FIG. 1. However, there is no need to clearly illustrate many conventional components. For example, the computer device 100 may be configured to include at least a portion of the I/O device 150 or may further include other components, such as a transceiver and a database.

The example embodiments relate to a model compression method and system for optimizing an artificial intelligence (AI) model to an equipment-friendly model, and more particularly, to a model compression method and system that may achieve a real seed-up on any hardware that does not support an acceleration library while naturally achieving global pruning by blending two aspects, criteria and sparsity, using the result of unstructured pruning and by actually pruning filters.

For example, criteria-based pruning may refer to a method of pruning a filter having a relatively low sum based on a sum of values of elements of a matrix that constitute the filter. Also, sparsity-based pruning may refer to a method of pruning a filter having a relatively large number of zero values by counting the number of zero values among values of elements of a matrix that constitute the filter.

Figure 2:
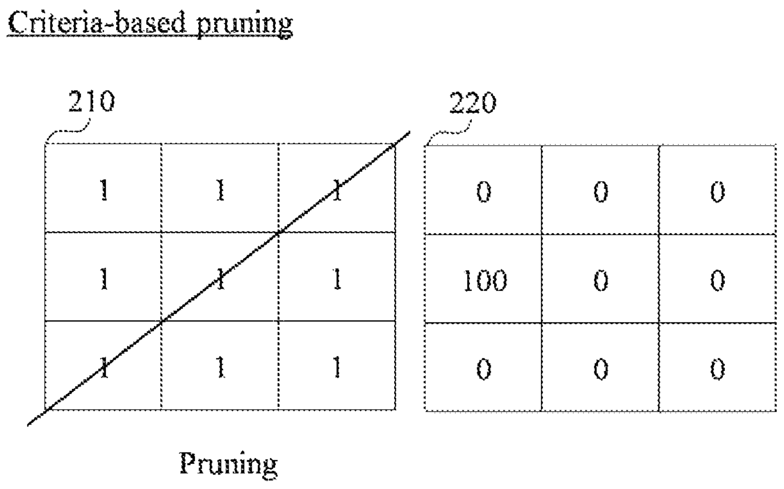
FIG. 2 illustrates an example of criteria-based pruning according to an example embodiment.
Figure 3:
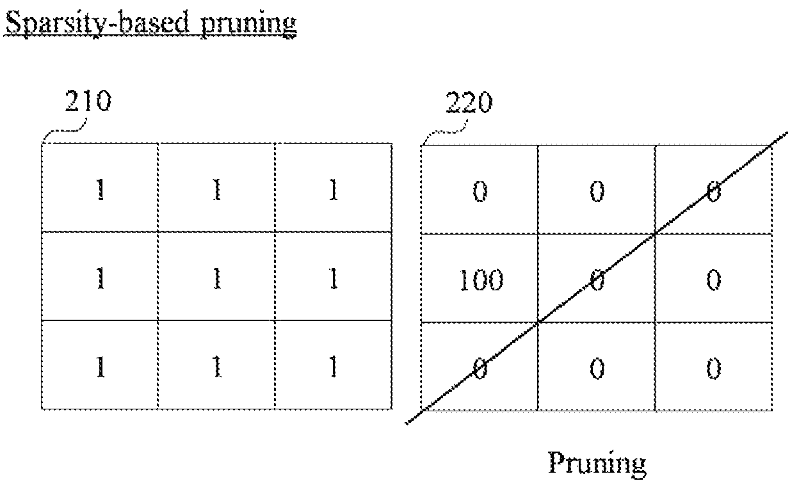
FIG. 3 illustrates an example of sparsity-based pruning according to an example embodiment.

FIG. 2 illustrates an example of criteria-based pruning according to an example embodiment, and FIG. 3 illustrates an example of sparsity-based pruning according to an example embodiment. As described above, the example embodiments relate to a compression method and system for applying structured pruning by appropriately using the result to which unstructured pruning is applied. Therefore, the model compression system according to the example embodiment may quickly acquire criteria and sparsity for each filter from a model to which unstructured pruning is already applied. Here, a filter to be pruned may be changed according to the criteria and the sparsity.

Here, the example embodiment of FIG. 2 represents an example in which a single layer includes two filters, a first filter 210 and a second filter 220, each with a size of 3×3, and the first filter 210 is pruned based on criteria with a pruning ratio of 50%.

On the contrary, the example embodiment of FIG. 3 represents an example in which a single layer includes two filters, the first filter 210 and the second filter 220, each with a size of 3×3, and the second filter 220 is pruned based on sparsity with a pruning ratio of 50%.

Numbers filled in the first filter 210 and the second filter 220 may represent weight values. The criteria may be calculated with a sum of such weight values and the sparsity may be calculated based on the number of zero weight values.

Figure 4:
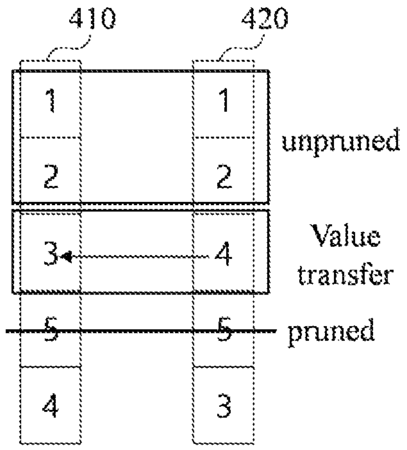
FIG. 4 illustrates an example of applying structured pruning in consideration of both criteria and sparsity according to an example embodiment.

FIG. 4 illustrates an example of applying structured pruning in consideration of both criteria and sparsity according to an example embodiment. A model compression system according to the example embodiment may order filters that constitute a layer according to each of the criteria and the sparsity. The example embodiment represents a list 410 of filtered ordered based on the sparsity and a list 420 of filters ordered based on the criteria. Here, in the lists 410 and 420, each number may represent an index of each filter before ordering. For example, a filter of index '3' is ordered in the third in the list 410 and ordered in the fifth in the list 420.

Here, the model compression system may exclude filters that remain in consideration of both the sparsity and the criteria from a pruning target and may prune filters that are selected as the pruning target in consideration of both the sparsity and the criteria. Here, in the case of selecting the number of filters by a pruning ratio based on the sparsity as the pruning target, filters that remain based on the sparsity may represent filters that are excluded from the pruning target. In the case of selecting the number of filters by a pruning ratio based on the criteria as the pruning target, filters that remain based on the criteria may represent filters that are excluded from the pruning target. That is, filters that remain based on both standards may represent filters that are not the pruning target in the respective standards, the sparsity and the criteria.

In the example embodiment of FIG. 4, a filter with index '1' and a filter with index '2' are excluded from the pruning target based on both standards, the sparsity and the criteria, and may be excluded from a final pruning target accordingly. Meanwhile, a filter with index '5' is selected as the pruning target based on both standards, the sparsity and the criteria, and may be selected as the final pruning target and pruned.

Meanwhile, in the example embodiment of FIG. 4, the filter with index '3' is excluded from the pruning target based on the sparsity and included as the pruning target based on the criteria. Conversely, a filter with index '4' is excluded from the pruning target based on the criteria and included as the pruning target based on the sparsity. Also, it can be seen that an order of the filter with index '3' in the list 410 and an order of the filter with index '4' in the list 420 are the same. Here, the model compression system may select two filters as filters for value transfer.

Also, the model compression system may overwrite non-zero values constituting the filter (filter with index '4') that remains based on the criteria among the filters for value transfer at the same locations of the filter (filter with index '3') of the same order that remains based on the sparsity.

Figure 5:
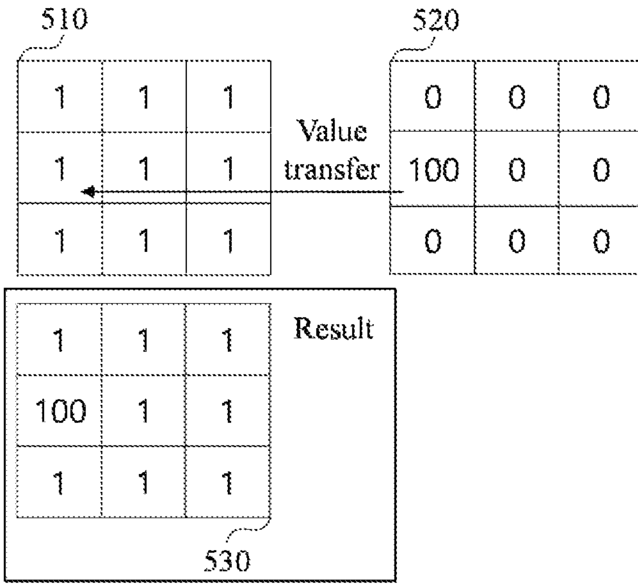
FIG. 5 illustrates an example of overwriting a value according to an example embodiment.

FIG. 5 illustrates an example of overwriting a value according to an example embodiment. A filter 510 may correspond to the filter with index '3' in the example embodiment of FIG. 4 and a filter 520 may correspond to the filter with index '4' in the example embodiment of FIG. 4. Here, it is assumed that the filter 520 is a filter that remains based on criteria and is selected as a pruning target based on sparsity. Here, to use non-zero values of the filter 520, the model compression system may overwrite the non-zero values of the filter 520 in the filter 510 that is a filter of the same order as that of the filter 520. Here, the model compression system may overwrite a non-zero value of the filter 520 at the same location of the filter 510. In the example embodiment of FIG. 5, a filter 530 may correspond to the filter 510 in which the non-zero value of the filter 520 is overwritten at the same location. After transferring a value to the filter 510, the filter 520 may be selected as the pruning target and removed.

Figure 6:
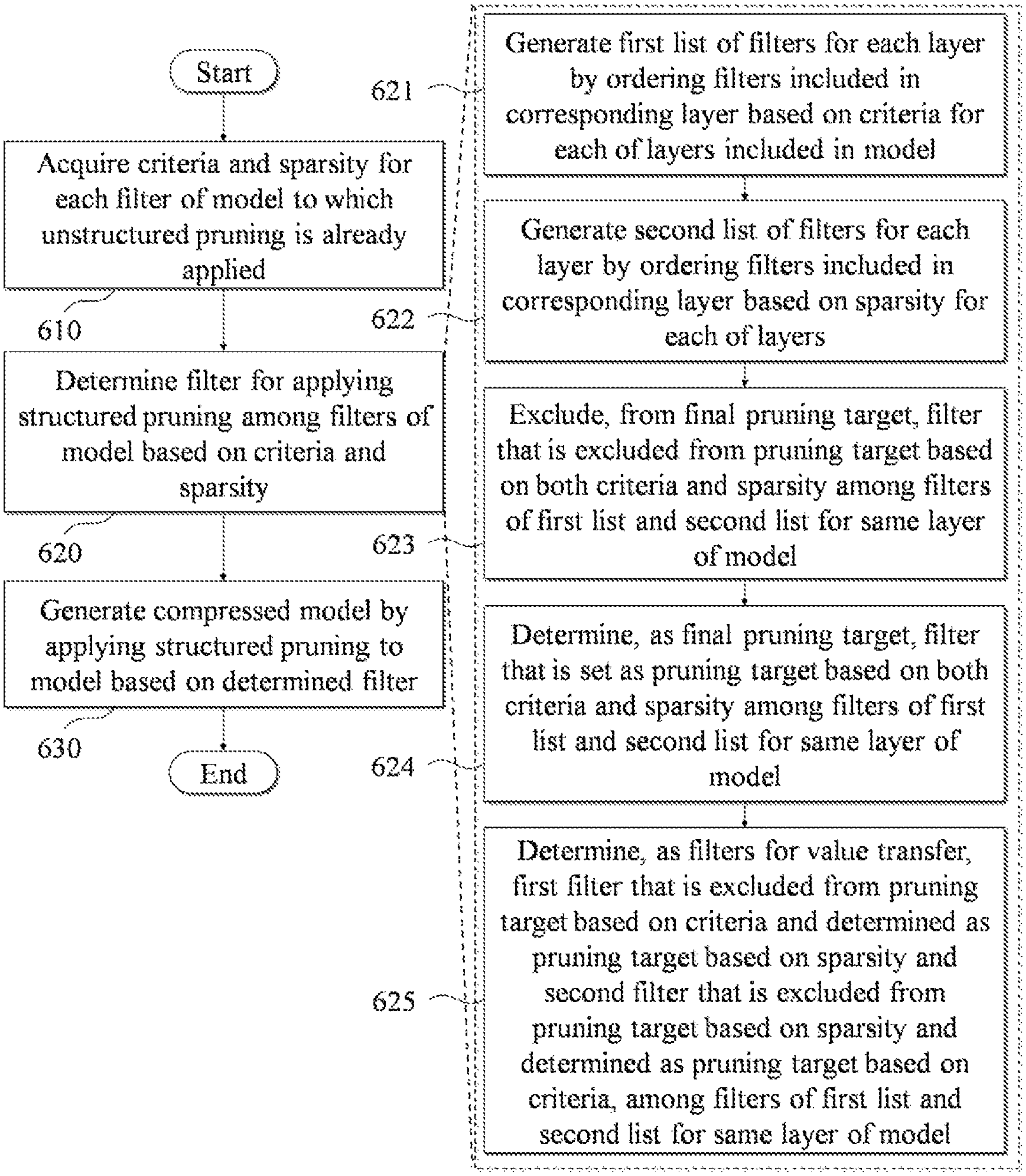
FIG. 6 is a flowchart illustrating an example of a model compression method according to an example embodiment.

FIG. 6 is a flowchart illustrating an example of a model compression method according to an example embodiment. The model compression method according to the example embodiment may be performed by the computer device 100 of FIG. 1. Here, the processor 120 of the computer device 100 may be configured to execute a control instruction according to a code of at least one computer program or a code of an OS included in the memory 110. Here, the processor 120 may control the computer device 100 to perform operations 610 to 630 included in the method of FIG. 6 according to a control instruction provided from a code stored in the computer device 100.

Referring to FIG. 6, in operation 610, the computer device 100 may acquire criteria and sparsity for each filter of a model to which unstructured pruning is already applied. For example, the computer device 100 may receive a model to which unstructured pruning is applied. Also, the computer device 100 may derive the criteria and the sparsity for each filter of the model. As described above, the criteria and the sparsity for each filter may be quickly acquired from the model to which the unstructured pruning is already applied.

In operation 620, the computer device 100 may determine a filter for applying structured pruning among filters of the model based on the criteria and the sparsity. Operation 620 may include operations 621 to 625 depending on example embodiments. For example, the filter for applying the structured pruning may include a filter for value transfer and a filter to be removed from the model, which are described below in operation 625.

In operation 621, the computer device 100 may generate a first list of filters for each layer by ordering filters included in a corresponding layer based on the criteria for each of layers included in the model. For example, the list 420 of filters ordered based on the criteria is described above with reference to the example embodiment of FIG. 4.

In operation 622, the computer device 100 may generate a second list of filters for each layer by ordering filters included in the corresponding layer based on the sparsity for each of the layers. For example, the list 410 of filters ordered based on the sparsity is described above with reference to the example embodiment of FIG. 4.

In operation 623, the computer device 100 may exclude, from a final pruning target, a filter that is excluded from a pruning target based on both the criteria and the sparsity among the filters of the first list and the second list for the same layer of the model. An example of excluding, from the pruning target, the filter with index '1' and the filter with index '2' that remain based on both the criteria and the sparsity is describe above through the example embodiment of FIG. 4.

In operation 624, the computer device 100 may determine, as the final pruning target, a filter that is set as the pruning target based on both the criteria and the sparsity among the filters of the first list and the second list for the same layer of the model. Through the example embodiment of FIG. 4, it is described that the filter with index '5' excluded based on both the criteria and the sparsity is selected as the pruning target and pruned.

In operation 625, the computer device 100 may determine, as filters for value transfer, a first filter that is excluded from the pruning target based on the criteria and determined as the pruning target based on the sparsity and a second filter that is excluded from the pruning target based on the sparsity and determined as the pruning target based on the criteria, among the filters of the first list and the second list for the same layer of the model. Here, an order of the first filter in the first list and an order of the second filter in the second list may be the same. For example, an example in which the model compression system overwrites non-zero values of the filter 520 on the filter 510 that is a filter of the same order as that of the filter 520 to use non-zero values of the filter 520 that remains based on the criteria and is excluded based on the sparsity is described above through the example embodiment of FIG. 5. Also, it is described above that the model compression system may overwrite a non-zero value of the filter 520 at the same location of the filter 510.

In operation 630, the computer device 100 may apply the structured pruning to the model based on the determined filter. In an example embodiment, the computer device 100 may overwrite at least one value of a first filter that is determined based on the criteria on a second filter that is determined based on the sparsity and corresponds to the first filter, for the same layer of the model. For example, the computer device 100 may overwrite a non-zero value constituting the first filter at the same location in the second filter. In this case, the first filter may be set as the pruning target, and the second filter overwritten with the non-zero value may be excluded from the pruning target. Also, the computer device 100 may generate a compressed model by removing the determined filter from the model.

As described above, the computer device 100 may achieve a real speed-up on any hardware that does not support an acceleration library while naturally achieving global pruning by blending two aspects, criteria and sparsity, and by actually pruning filters.

Figure 7:
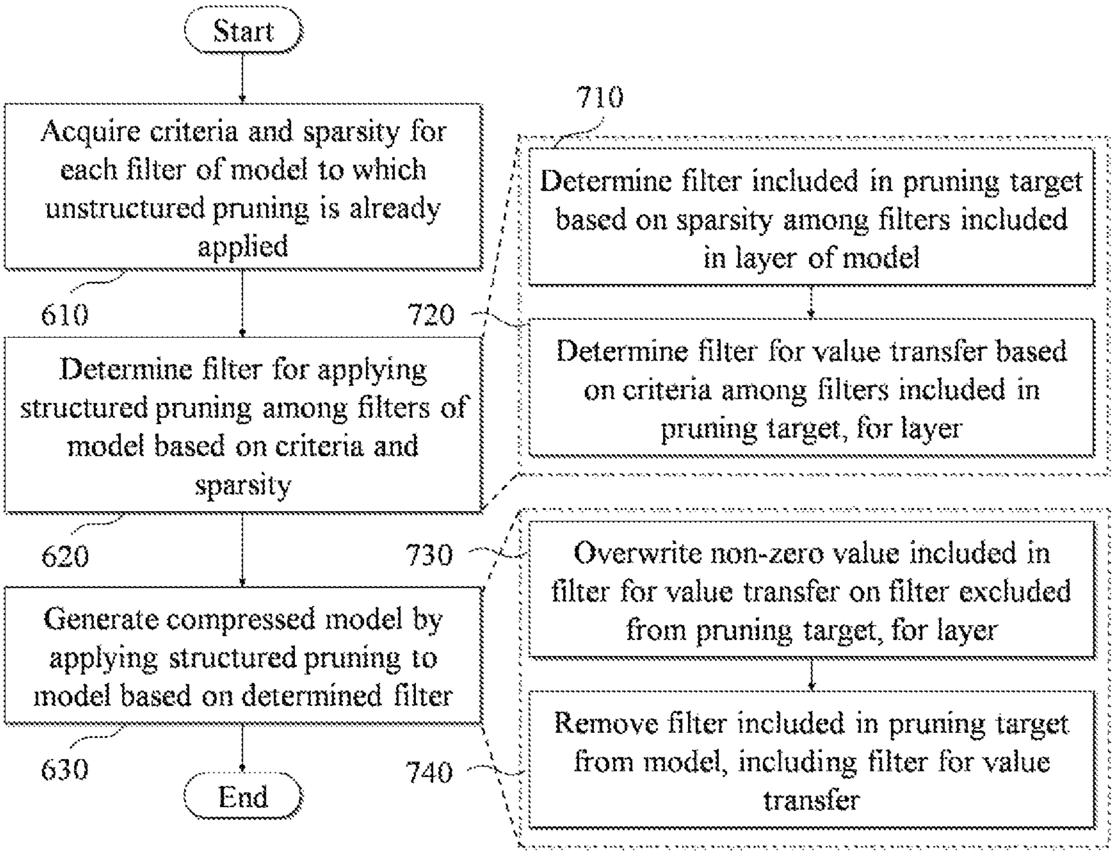
FIG. 7 is a flowchart illustrating another example of a model compression method according to an example embodiment.

FIG. 7 is a flowchart illustrating another example of a model compression method according to an example embodiment. The model compression method according to the example embodiment may include operations 610 to 630 of FIG. 6. Here, operation 620 may include operations 710 and 720 of FIG. 7 and operation 630 may include operations 730 and 740 of FIG. 7.

In operation 710, the computer device 100 may determine a filter included in a pruning target based on the sparsity among filters included in a layer of the model. Later, the computer device 100 may remove, from the model, the filter that is determined as the pruning target based on the sparsity.

In operation 720, the computer device 100 may determine a filter for value transfer based on the criteria among filters included in the pruning target, for the layer. That is, the computer device 100 may verify an important value based on the criteria among values of the filter included in the pruning target, for the value transfer.

In operation 730, the computer device 100 may overwrite a non-zero value included in the filter for value transfer on a filter excluded from the pruning target, for the layer. In an example embodiment, the computer device 100 may overwrite at least one value of a first filter that is determined based on the criteria on a second filter that is determined based on the sparsity and corresponds to the first filter, for the same layer of the model. Here, that the first filter corresponds to the second filter may represent that an order of the first filter when filters of the same layer are ordered based on the criteria is the same as that of the second filter when the filters are ordered based on the sparsity. For example, an example in which the model compression system overwrites non-zero values of the filter 520 on the filter 510 that is the filter of the same order based on the sparsity as that of the filter 520 based on the criteria to use the non-zero values of the filter 520 that remains based on the criteria and is excluded based on the sparsity is described above with reference to the example embodiment of FIG. 5. In detail, for example, the computer device 100 may overwrite a non-zero value included in a filter for value transfer at the same location within a filter excluded from the pruning target. Here, an order of the filter for value transfer when filters of the same layer are ordered based on the criteria and an order of the filter excluded from the pruning target when the filters of the same layer are ordered based on the sparsity may be the same. Through this, even in the filter that is determined as the pruning target, an important value based on the criteria may be overwritten in the filter excluded from the pruning target through value transfer and thereby used.

In operation 740, the computer device 100 may remove the filter included in the pruning target from the model, including the filter for value transfer. As described above, the computer device 100 may generate the compressed model by removing the filter included in the pruning target from the model.

An inference system according to example embodiments may be implemented by at least one computer device and an inference method according to example embodiment may be performed through the at least one computer device included in the inference system. A computer program according to an example embodiment may be installed and executed in the computer device and the computer device may perform the inference method according to example embodiments under control of the executed computer program. The computer program may be stored in computer-readable media to execute the inference method in the computer device in conjunction with the computer device.

Figure 8:
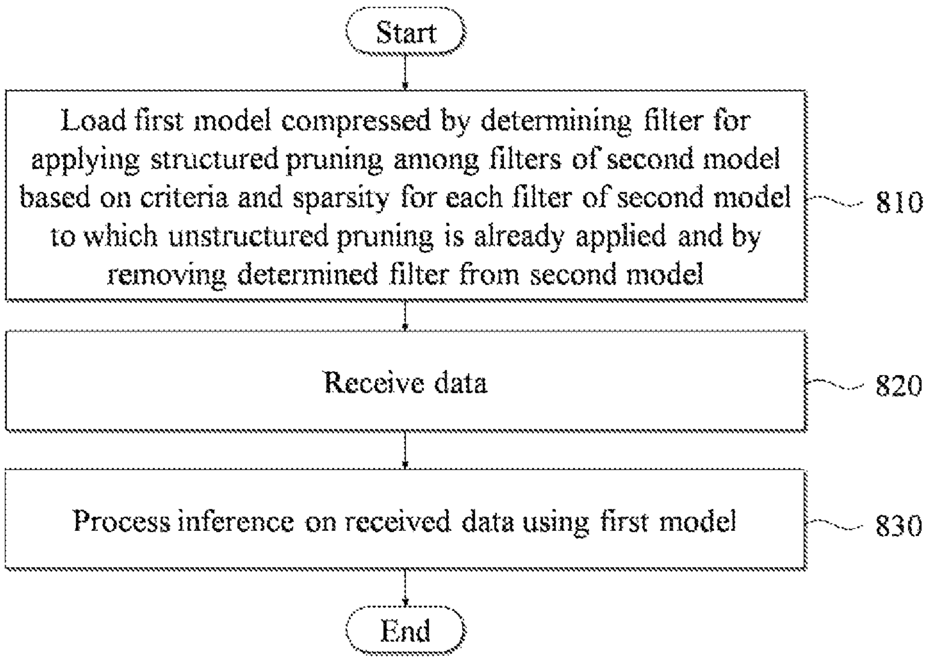
FIG. 8 is a flowchart illustrating an example of an inference method according to an example embodiment.

FIG. 8 is a flowchart illustrating an example of an inference method according to an example embodiment. The inference method according to the example embodiment may be performed by the computer device 100 of FIG. 1. Here, the processor 120 of the computer device 100 may be implemented to execute a control instruction according to a code of at least one computer program or a code of an OS included in the memory 110. Here, the processor 120 may control the computer device 100 to perform operations 810 to 830 included in the method of FIG. 8 in response to a control instruction provided from the code stored in the computer device 100.

For example, a compressed model (AI model) according to the example embodiments may be provided and a user provided with the model may process inference on data using the provided model.

In operation 810, the computer device 100 may load a first model compressed by determining a filter for applying structured pruning among filters of a second model based on criteria and sparsity for each filter of the second model to which unstructured pruning is already applied and by removing the determined filter from the second model. For example, the computer device 100 may load a program code for the AI model as the first model to the memory 110.

Here, the first model to be loaded may be a model from which a filter determined as a pruning target based on each of the criteria and the sparsity is removed for the same layer of the second model. Also, the first model may be a model in which a non-zero value constituting a filter excluded from the pruning target based on the criteria is overwritten at the same location in the same order of a filter excluded from the pruning target based on the sparsity, for the same layer of the second model. Here, the same order may represent that an order by the criteria and an order by the sparsity are the same for filters included in the same layer.

In operation 820, the computer device 100 may receive data. Here, the data may be data input to the first model for inference using the first model. Depending on example embodiments, the order of operations 810 and 820 may be changed.

In operation 830, the computer device 100 may process inference on the received data using the first model. For example, the computer device 100 may input the data received in operation 820 to the first model and may process the inference on the data.

As described above, according to example embodiments, there may be provided a model compression method and system for compressing a model for optimizing to an equipment-friendly model. Also, it is possible to provide a compressed AI model through the compression method and system. Also, it is possible to provide an inference method and system using the compressed AI model. Also, by blending two aspects, criteria and sparsity, using the result of unstructured pruning and by actually pruning filters, it is possible to achieve a real speed-up on any hardware that does not support an acceleration library while naturally achieving global pruning. Also, since it is possible to directly apply to pretrained models to which unstructured pruning provided from PyTorch or Tensorflow-keras is applied, quick convergence of a model may be expected in a finetuning process.

The systems and/or the apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the example embodiments may be recorded in non-transitory computer-readable media including program instructions to implement various operations embodied by a computer. Also, the media may include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of non-transitory computer-readable media include magnetic media such as hard disks, floppy disks, and magnetic tapes; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of the program instructions include a machine language code such as produced by a compiler and an advanced language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A model compression method of a computer device comprising at least one processor, the model compression method comprising:

receiving, by the at least one processor, a model to which unstructured pruning is applied;

deriving, by the at least one processor, criteria and sparsity for each filter of the model;

determining, by the at least one processor, a filter for applying structured pruning among filters of the model based on the criteria and the sparsity; and generating, by the at least one processor, a compressed model by applying the structured pruning to the model based on the determined filter, wherein the generating of the compressed model comprises:

overwriting, for a same layer of the model to which the unstructured pruning is applied, at least one value of a first filter on a second filter corresponding to the first filter, the first filter being determined to be included in a pruning target based on a first criterion that is any one of the criteria and the sparsity and excluded from the pruning target based on a second criterion that is the other of the criteria and the sparsity, and the second filter being determined to be excluded from the pruning target based on the first criterion and included in the pruning target based on the second criterion; and pruning the first filter.

2. The model compression method of claim 1, wherein the determining comprises:

generating a first list of filters for each layer by ordering filters included in a corresponding layer based on the criteria for each of layers included in the model; and generating a second list of filters for each layer by ordering filters included in the corresponding layer based on the sparsity for each of the layers.

3. The model compression method of claim 2, wherein the determining comprises:

excluding, from a final pruning target, a filter that is excluded from a pruning target based on both the criteria and the sparsity among the filters of the first list and the second list for the same layer of the model; and determining, as the final pruning target, a filter that is set as the pruning target based on both the criteria and the sparsity among the filters of the first list and the second list for the same layer of the model.

4. The model compression method of claim 2, wherein the determining further comprises determining, as filters for value transfer, the first filter that is excluded from the pruning target based on the criteria and determined as the pruning target based on the sparsity and the second filter that is excluded from the pruning target based on the sparsity and determined as the pruning target based on the criteria, among the filters of the first list and the second list for the same layer of the model, and the second filter corresponds to the first filter by an order of the first filter in the first list and an order of the second filter in the second list being the same.

5. The model compression method of claim 1, wherein the at least one value of the first filter is a non-zero value, and wherein the overwriting comprises overwriting the a non-zero value constituting the first filter at the same location in the second filter.

6. The model compression method of claim 1, wherein an order of the first filter when filters of the same layer are ordered based on the criteria and an order of the second filter when the filters of the same layer are ordered based on the sparsity are the same.

7. The model compression method of claim 1, wherein the determining comprises:

determining the first filter included in the pruning target by the first criterion being the sparsity among filters included in the layer of the model; and determining the second filter included in the pruning target by the second criterion being for value transfer based on the criteria among filters included in the layer.

8. The model compression method of claim 7, wherein the generating of the compressed model comprises:

overwriting a non-zero value included in the determined first filter on the second filter.

9. An inference method of a computer device comprising at least one processor, the inference method comprising:

processing inference for input data using a compressed model, wherein the compressed model is generated by determining a filter for applying structured pruning among filters of a base model based on criteria and sparsity for each filter of the base model to which unstructured pruning has already been applied;

applying the structured pruning to the base model based on the determined filter, wherein the applying of the structured pruning comprises:

overwriting, for a same layer of the base model, at least one value of a first filter on a second filter corresponding to the first filter, the first filter being determined to be included in a pruning target based on a first criterion that is any one of the criteria and the sparsity and excluded from the pruning target based on a second criterion that is the other of the criteria and the sparsity, and the second filter being determined to be excluded from the pruning target based on the first criterion and included in the pruning target based on the second criterion; and pruning the first filter.

10. The inference method of claim 9, wherein a filter that is determined to be included in the pruning target based on each of the criteria and the sparsity for the same layer of the base model is pruned from the base model.

11. A non-transitory computer-readable recording medium storing instructions that when executed by a processor, cause the processor to perform the method of claim 1.

12. A computer device comprising:

at least one processor configured to execute computer-readable instructions, wherein the at least one processor is configured to:

receive a model to which unstructured pruning is applied;

derive criteria and sparsity for each filter of the model, determine a filter for applying structured pruning among filters of the model based on the criteria and the sparsity, and generate a compressed model by applying the structured pruning to the model based on the determined filter, wherein, to generate the compressed model, the at least one processor is configured to:

overwrite, for a same layer of the model to which the unstructured pruning is applied, at least one value of a first filter on a second filter corresponding to the first filter, the first filter being determined to be included in a pruning target based on a first criterion that is any one of the criteria and the sparsity and excluded from the pruning target based on a second criterion that is the other of the criteria and the sparsity, and the second filter being determined to be excluded from the pruning target based on the first criterion and included in the pruning target based on the second criterion; and prune the first filter.

13. The computer device of claim 12, wherein, to determine the filter for applying the structured pruning, the at least one processor is configured to:

generate a first list of filters for each layer by ordering filters included in a corresponding layer based on the criteria for each of layers included in the model, and generate a second list of filters for each layer by ordering filters included in a corresponding layer based on the sparsity for each of the layers.

14. The computer device of claim 13, wherein, to determine the filter for applying the structured pruning, the at least one processor is configured to:

exclude, from a final pruning target, a filter that is excluded from a pruning target based on both the criteria and the sparsity among the filters of the first list and the second list for the same layer of the model, and determine, as the final pruning target, a filter that is set as the pruning target based on both the criteria and the sparsity among the filters of the first list and the second list for the same layer of the model.

15. The computer device of claim 8, wherein, to determine the filter for the structured pruning, the at least one processor is configured to:

determine, as filters for value transfer, the first filter that is excluded from the pruning target based on the criteria and determined as the pruning target based on the sparsity and the second filter that is excluded from the pruning target based on the sparsity and determined as the pruning target based on the criteria, among the filters of the first list and the second list for the same layer of the model, and the second filter corresponds to the first filter by an order of the first filter in the first list and an order of the second filter in the second list being the same.

16. The computer device of claim 12, wherein, to determine the filter for the structured pruning, the at least one processor is configured to:

determine the first filter included in the pruning target by the first criterion being the sparsity among filters included in the layer of the model, determine the second filter included in the pruning target by the second criterion being the criteria among filters included in the layer, and overwrite a non-zero value included in the first filter on the second filter.

* * * * *